US007131181B2

(12) United States Patent
Schmitz et al.

(10) Patent No.: US 7,131,181 B2
(45) Date of Patent: Nov. 7, 2006

(54) TOOL FOR MANUFACTURING BALLPOINT PENS

(75) Inventors: David Schmitz, London (GB); Anne Schmitz, Ottawa (CA)

(73) Assignee: Societe BIC, Clichy Cedex (FR)

( * ) Notice: Subject to any disclaimer, the term of this patent is extended or adjusted under 35 U.S.C. 154(b) by 0 days.

(21) Appl. No.: 10/893,759

(22) Filed: Jul. 16, 2004

(65) Prior Publication Data

US 2005/0035089 A1 Feb. 17, 2005

Related U.S. Application Data

(63) Continuation of application No. PCT/FR03/00150, filed on Jan. 17, 2003.

(51) Int. Cl.
*B23P 23/00* (2006.01)
*B23P 11/00* (2006.01)

(52) U.S. Cl. ........................ 29/566; 29/56.5; 29/441.2; 72/115; 408/22; 408/25

(58) Field of Classification Search .................. 29/566, 29/56.5, 808, 441.2; 408/22, 24, 25, 30, 408/189, 193; 72/115, 126
See application file for complete search history.

(56) References Cited

U.S. PATENT DOCUMENTS

| | | | | | |
|---|---|---|---|---|---|
| 2,646,761 | A | * | 7/1953 | Knobel | 29/441.1 |
| 2,791,137 | A | * | 5/1957 | Jones | 72/344 |
| 2,891,511 | A | * | 6/1959 | Fehling | 401/216 |
| 2,896,250 | A | * | 7/1959 | Burnie | 53/561 |
| 2,969,030 | A | * | 1/1961 | Kahn et al. | 29/441.2 |
| 2,970,558 | A | * | 2/1961 | Albertini | 401/209 |
| 2,992,572 | A | * | 7/1961 | Lockart | 29/243.517 |
| 3,099,082 | A | * | 7/1963 | Henriksen | 29/523 |
| 3,181,228 | A | * | 5/1965 | Droubay | 29/441.2 |
| 3,230,935 | A | * | 1/1966 | Fehling et al. | 401/216 |
| 3,315,347 | A | * | 4/1967 | Schachter | 29/441.1 |
| 3,502,418 | A | * | 3/1970 | Payne | 401/215 |
| 3,678,565 | A | * | 7/1972 | Linz et al. | 29/441.2 |
| 4,134,199 | A | * | 1/1979 | Liguori | 29/441.2 |
| 4,231,146 | A | * | 11/1980 | Nakagawa et al. | 29/432 |
| 4,539,832 | A | * | 9/1985 | Koller | 72/118 |
| 4,547,946 | A | * | 10/1985 | Osaki et al. | 29/412 |
| 4,547,947 | A | * | 10/1985 | Oshita | 29/412 |
| 4,619,130 | A | * | 10/1986 | Buzzi | 72/124 |
| 4,717,277 | A | * | 1/1988 | Hutt | 401/216 |
| 4,722,124 | A | * | 2/1988 | Serikawa et al. | 29/441.2 |
| 4,789,263 | A | * | 12/1988 | Germann | 401/209 |
| 5,137,397 | A | * | 8/1992 | Koketsu | 408/1 R |
| 5,520,473 | A | * | 5/1996 | Durham | 401/216 |
| 5,649,795 | A | * | 7/1997 | Durham | 408/189 |
| 5,899,625 | A | * | 5/1999 | Ando et al. | 401/216 |

(Continued)

FOREIGN PATENT DOCUMENTS

| | | |
|---|---|---|
| CN | 378 188 A | 5/1964 |

(Continued)

*Primary Examiner*—Essama Omgba
(74) *Attorney, Agent, or Firm*—Jones Day

(57) ABSTRACT

A tool and method of manufacturing a tool for making ballpoint pen tips, called rough tips, in their seat zone and preferably in their cone zone. The tool is mounted in fast-rotating precision spindles and the position of the tool may be adjusted to adjust the dimensions of the tip to be formed by the tool. The equipment is configured in a single-piece unit. A seat zone element for making the seat zone and preferably a cone element for making the cone of the tip may be formed on a base component.

9 Claims, 4 Drawing Sheets

U.S. PATENT DOCUMENTS 5,904,432 A * 5/1999 Ando et al. ................. 401/209

FOREIGN PATENT DOCUMENTS

| | | | | |
|---|---|---|---|---|
| DE | 14 02 888 | A | | 10/1968 |
| JP | 02160597 | A | * | 6/1990 |
| JP | 11348486 | A | * | 12/1999 |
| JP | 2001171279 | A | * | 6/2001 |
| JP | 2001171280 | A | * | 6/2001 |
| JP | 2003170691 | A | * | 6/2003 |
| JP | 2004114469 | A | * | 4/2004 |

* cited by examiner

TOOL FOR MANUFACTURING BALLPOINT PENS

CROSS REFERENCE TO RELATED APPLICATION

The present application is a continuation of co-pending International Patent Application PCT/FR03/00150, filed on Jan. 17, 2003, which claims priority to European Patent Application No. 02450008.4, filed Jan. 17, 2002. The entire content of both these applications is expressly incorporated herein by reference.

FIELD OF THE INVENTION

The present invention relates to a tool for manufacturing the seat areas and preferably the cone areas of ballpoint pen tips, called rough tips. The present invention also relates to the manufacture of such tools and their mounting in high-speed precision spindles.

BACKGROUND OF THE INVENTION

In the prior art, seat areas and cone areas of rough ball point pen tips (tips without a tip ball inserted therein and prior to deformation to enclose the tip ball therein) were machined in succession by means of ordinary automatic machines with speed change disks in different successive stages of working. As a result, neither the eccentricity nor the burring was sufficiently well controlled. Subsequently, multi-part tools which could be maintained in such a way as to be mounted and fixed individually in a common clamping device were developed. This admittedly resolved the problem of eliminating burring, but concentricity accurate to a micrometer and the desired dimensions of the writing tips could only be achieved with the greatest difficulty, since there were no available high-speed high-precision spindles whose axis of rotation, from the stationary state to the maximum rotation speed, showed a deviation of less than 0.5 micrometers.

SUMMARY OF THE INVENTION

An object of the invention is to manufacture a rough tip with a precision never attained previously. The present invention accordingly relates to a tool and a method for precisely manufacturing a rough tip.

BRIEF DESCRIPTION OF THE DRAWINGS

The present invention is described in greater detail below with reference to the drawings in which.

DETAILED DESCRIPTION OF THE INVENTION

Figure 1:
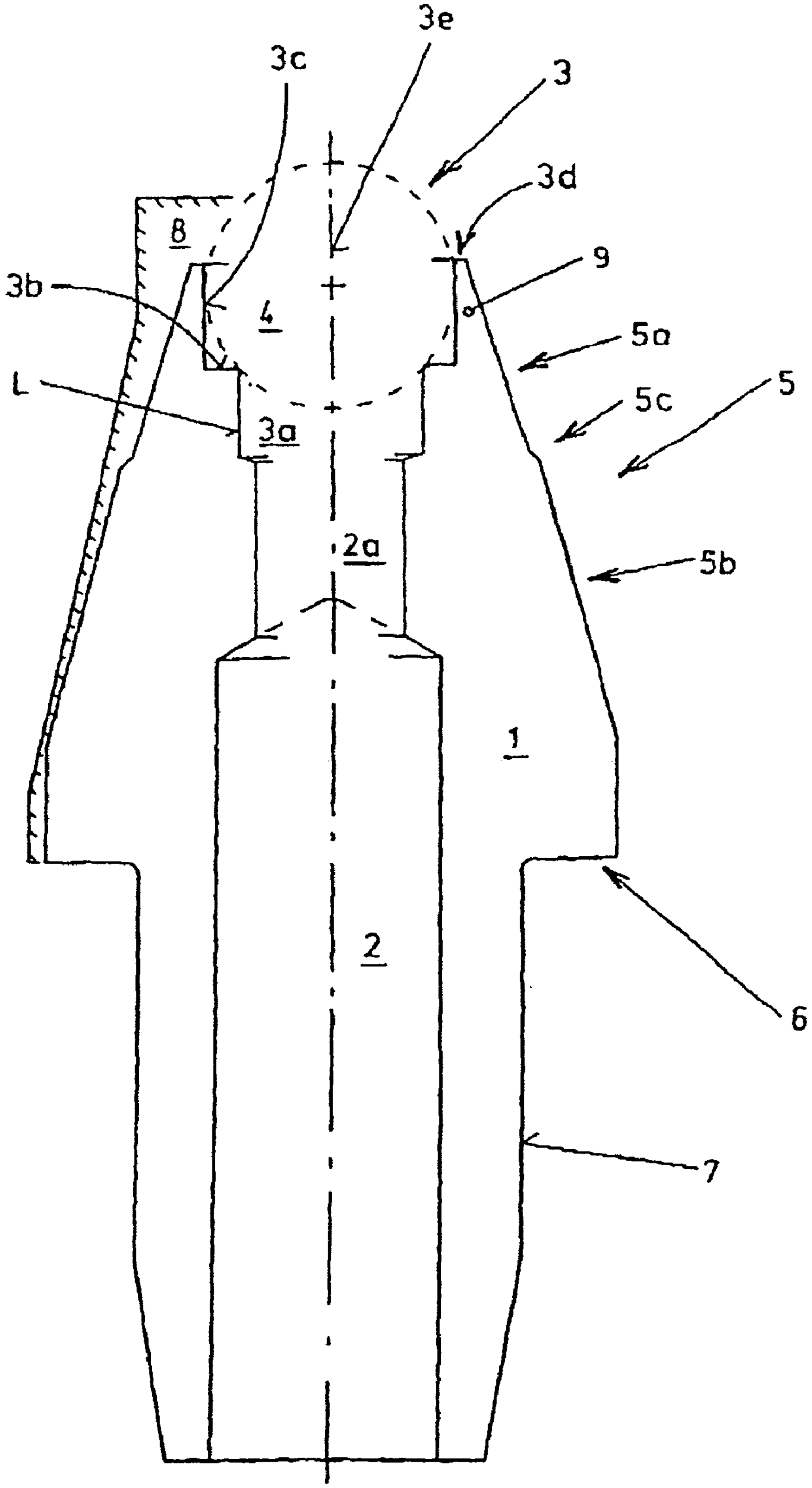
FIG. 1 shows an elevational view of a ballpoint pen tip as it can be formed, for example, by means of the tool according to the present invention.

FIG. 1 shows a ballpoint pen tip after completion of machining by chip removal (rough tip) with a ball inserted for the purpose of explanation only. Such ballpoint pen tips usually consist of brass or nickel silver which are easily machined by chip removal with short chips.

As shown in FIG. 1, a ballpoint pen tip 1 has a very complex structure. Essentially, it has a central channel 2 for directing the ballpoint pen ink, referred to hereafter as "ink" for the sake of simplicity, which passes through a bore 2*a* into a seat area 3 for the ball 4. This seat area 3 has a pilot bore 3*a* in the extension of the bore 2*a*, a base surface 3*b* of annular shape, and a cylindrical bore 3*c*, which opens on a front surface 3*d*.

The outer profile, located in the extension of the front surface 3*d*, consists of a cone 5*a*, which, together with the seat area 3, forms what is called the lip (the flange) 9. In the illustrated exemplary embodiment, the cone 5*a* is joined by a shoulder 5*c* to another cone 5*b*, whose configuration and function are explained below. These are then joined to a shoulder 6 and a barrel 7.

This description does not cover the various transitions, chamfers, intermediate beads, and the like, since they are not particularly important for the understanding of the invention, and since they are well known from experience to persons skilled in the art of manufacturing ballpoint pen tips.

It should also be borne in mind, for a better understanding of the problems arising in the manufacture of such a ballpoint pen tip, that, for ballpoint pen tips such as those shown in the illustrated exemplary embodiment, the maximum diameter in the shoulder area 6 hardly exceeds 2 mm and the seat area 3 for the ball 4 must be formed with a precision of one micrometer or less. This precision must be achieved at maximum drive speeds (240 parts per minute, giving a time of 0.125 second for the actual machining by chip removal). The cost of such a ballpoint pen tip, usually formed from brass, is of the order of less than one U.S. cent.

It is extremely important for the quality of the finished ballpoint pen that the pilot bore 3*a* is precisely concentric with respect to the shoulder 3*b* and to the cylindrical bore 3*c*. Moreover, the front surface 3*d* must be configured precisely in the form of a cylinder of rotation with respect to the axis 3*e* of the seat area 3. The cone 5*a* must also be positioned precisely concentrically with respect to the axis 3*e*. In this description, "precisely" is taken to mean deviations of dimensions of shape and position within a range of 0.001 times the nominal diameter of the bore 3*c*.

The length of the pilot bore 3*a* is of equal importance to the concentricity of the pilot bore and the shoulder, for the following reasons. After the machining by chip removal of the ballpoint pen tip, the ink channels are formed in the area of transition between the pilot bore 3*a* and the shoulder 3*b*, by means of a stamping tool, and the ball is pressed into its seat in the axial direction. It is then important to ensure, in case of the appearance of "feathering" which may occur during this machining following the pushing back of the material with respect to the axis, that the ink flow is perfect in the finished ballpoint pen tip, this being guaranteed by a sufficient depth of the pilot bore.

FIG. 1 shows on the left-hand side the shape of the cold-pressed blank 8 from which the bores 2 and 2*a*, the seat area 3 and the cone 5*a* are subsequently machined by chip removal.

FIG. 1 also shows the imaginary insertion of a ball 4 to illustrate how the ball projects from the front surface 3*d*.

The ink channels are then stamped into the annular front surface 3*b*, the ball is inserted and pressed into the seat surface, and the flange area is deformed and clamped around the ball. The clamping, carried out by means of a rotary head for example, forms around the ball 4 and towards the seat a narrow annular concave gap having microscopic precision.

The geometric precision of this gap is the precondition of a high-quality ballpoint pen tip.

In the prior art, the seat area 3 and the cone 5 have to be formed by means of a multi-part tool, whose parts are positioned in a precision spindle operating at high speed (18000 to 60000 r.p.m.), while they can be adjusted and fixed individually in a tool head.

The bearings of the precision spindle consist of highly prestressed ball bearings with a contact angle of 15° to 30°, and are preferably hybrid bearings of the maximum precision class (ABEC 9) in a spindle housing having a precision of IT 01 to IT 1 with respect to mass, cylindricity, concentricity, and parallelism. Surfaces which are to house the bearings used must not have a roughness Ra exceeding 0.1. Because of this precision, the bearings can be prestressed beyond the usual limits without causing inadmissible heating of the spindle. The bearings can be lubricated by means of an oil mist, for example. A contactless joint, for example a labyrinth joint, is also required to limit the heat due to friction. The concentricity can also be controlled with spindles of this kind.

There remains the problem of adjusting multi-part tools with the necessary precision when they are dismantled for repair work and refitting, and also during the unclamping, adjustment, and other changes of position of the various parts of the tool. This makes it necessary to keep the clamping surfaces of the tool and the clamping device completely clean, since even the slightest changes in the clamping conditions, whether resulting from the presence of minute particles or modifications due to the clamping of the tool or the like will create uncertainty in the correlation before and after the correction.

The nature of the known multi-part tools which can be individually adjusted and fixed is such that the desired dimensions (with an accuracy of one micrometer) and the desired geometry (also with an accuracy of one micrometer) of the rough tip can only be obtained with great difficulty.

Attempts to create a one-piece (monolithic) tool for manufacturing the seat area 3 and preferably also the cone 5*a*, possibly with the shoulder 5*c*, have failed because such a tool, which normally consists of fine-grained tungsten carbide containing, for example, 4% Co, is very difficult to grind, particularly with an edge radius of 0.02 mm. Because of the wear on the grinding wheel, the wheel must be dressed frequently, with all the problems that this entails. The use of spark erosion is therefore advantageous. If a more modem material, for example a fine-grained polycrystalline diamond (DPC), is used, machining can only be carried out by spark erosion (EDM, electro-discharge machining), preferably by wire erosion (wire-EDM), with a wire diameter from 15 to 50 μm, to enable the requisite small transition radii to be manufactured.

Figure 2:
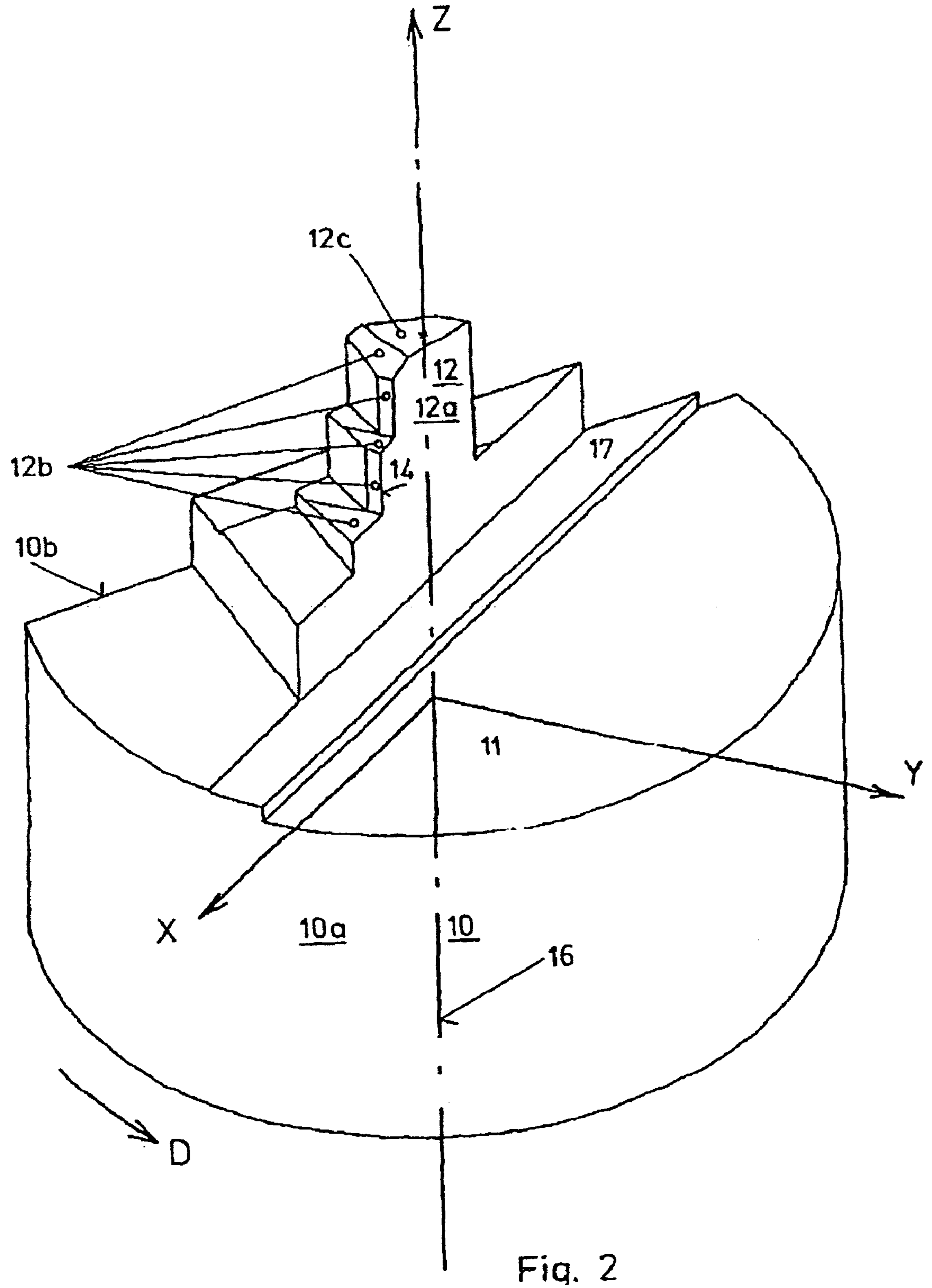
FIG. 2 shows a perspective view of a tool according to the present invention.

FIG. 2 shows a tool 10, according to the invention, which achieves this object. This tool is manufactured from a cylindrical rod with a diameter of 4 mm for example, with a roundness and cylindricity having a deviation of less than 0.5 μm. This precision can be achieved by centerless grinding.

This monolithic tool 10, which during the machining of a ballpoint pen tip rotates in the direction of the arrow D, has a base area 10*a* which has the previously mentioned roundness and cylindricity and acts as a reference. For this purpose, the base area 10*a* is preferably formed at an axial distance from the seat area element (preferably 1.5 mm away from the edge 10*b*) around the whole of its circumference. In the "upper" area, the base element is displaced in a step parallel to the axis 16, in the axial direction up to the complete base area, along the edge 10*b*, which is at an appropriate distance (at least 51% of the diameter of the bore 3*c*, FIG. 1). This step leaves space for a part of the tool (the cone element, not shown) which forms the cone area 5*a*. The cone element can be displaced in the step. The seat area element 12, which forms the pilot bore 3*a*, the annular base surface 3*b*, the cylindrical bore 3*c*, and the front surface 3*d* projects from the base.

In the illustrated exemplary embodiment, the seat area element 12 has a cutting profile 14 folded or stepped several times, which consists of the following section. The uppermost section creates the transition from the bore 2*a* to the pilot bore 3*a*, and the subsequent sections create the pilot bore 3*a*, the annular base surface 3*b*, the cylindrical bore 3*c*, and finally the front surface 3*d*. The cutting profile 14 is located in a face area 12*a* which is preferably 0.05 to 0.1 mm above the center of the base 10*a* (indicated by the point at which the axis 16 pierces the surface 12*c*). This enables the free surfaces 12*b* to be placed perpendicularly with respect to the face area 12*a*, making it possible to obtain a mechanically stable and wear-resistant cutting geometry.

A correction of the diameter of the seat area can be carried out from the clamping device by transverse displacement with respect to the axis 16, without removing the one-piece tool part 10 comprising the seat area element 12, the different distances between the sections of the seat area sections 3*a*, 3*b*, 3*c*, and 3*d* being unable to change with respect to one another on the tool because of the one-piece configuration of the tool. Only the diameters are modified simultaneously by the same amount as a result of the displacement. When the diameters reach the desired value, the exact projection of the ball above the front surface 3*d* is obtained without any further action.

This one-piece tool 10 for the seat area is completed, as mentioned above, with a part (not shown) for the cone area 5*a* and preferably for the shoulder 5*c*. In fact, the aforementioned problems of multi-part tools play only a negligible part, since there is no need to remove the one-piece tool 10 and only the thickness of the wall of the flange 9 (FIG. 1) can vary as a result of any deviations during the replacement of the cone element, within a range of a few micrometers, but the concentricity of this part is not affected. Because of this independent cone part, it is possible to adjust the thickness of the flange 9 independently of the diameters of the seat area 3, by shifting the cone part with respect to the one-piece part 10 along the plane extending parallel to the axis 16 and delimited by the edge 10*b*.

Figure 3:
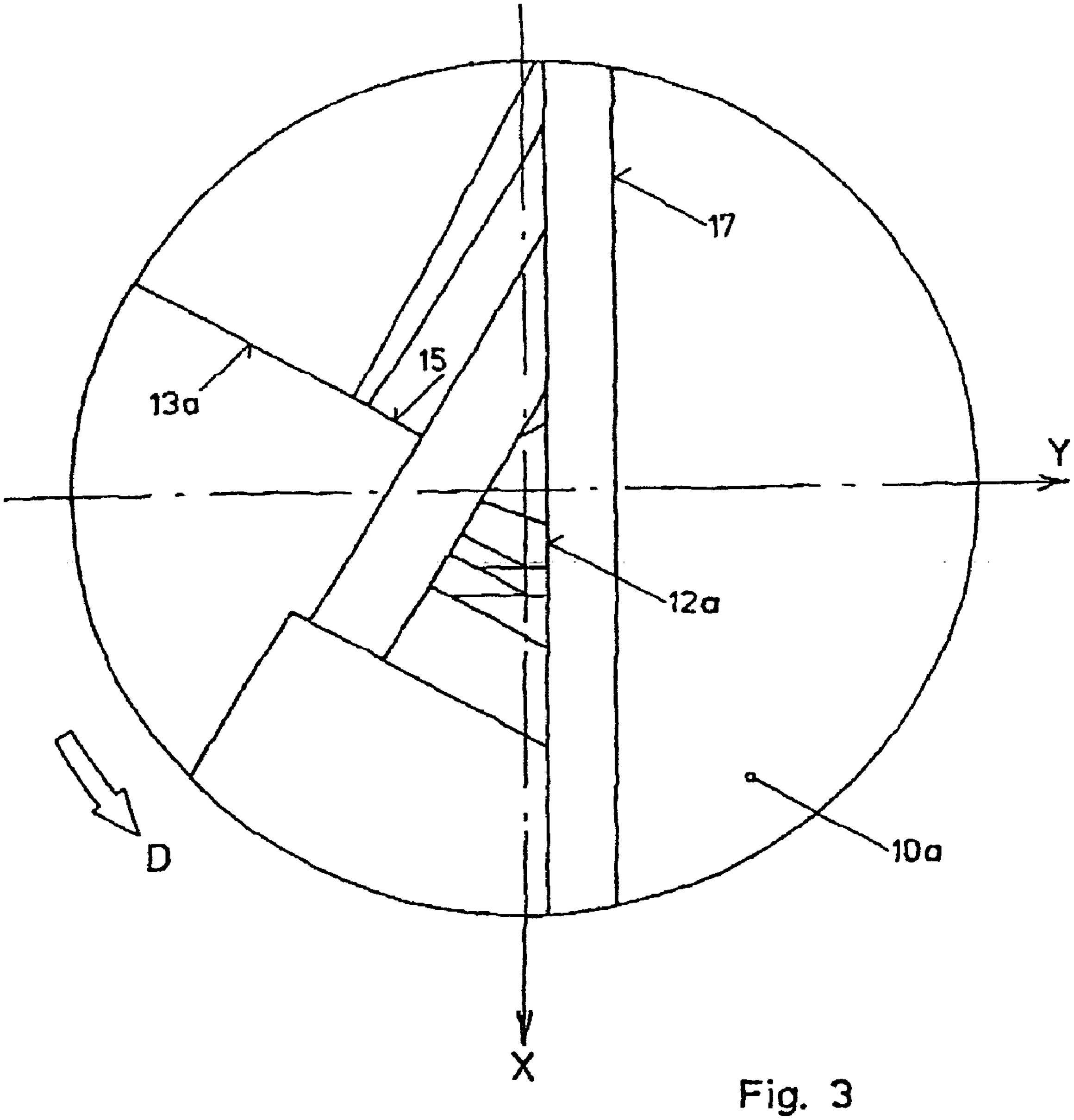
FIGS. 3 and 4 show a variant of a tool according to the present invention, FIG. 4 showing a perspective view and FIG. 3 choosing a plan view thereof.
Figure 4:
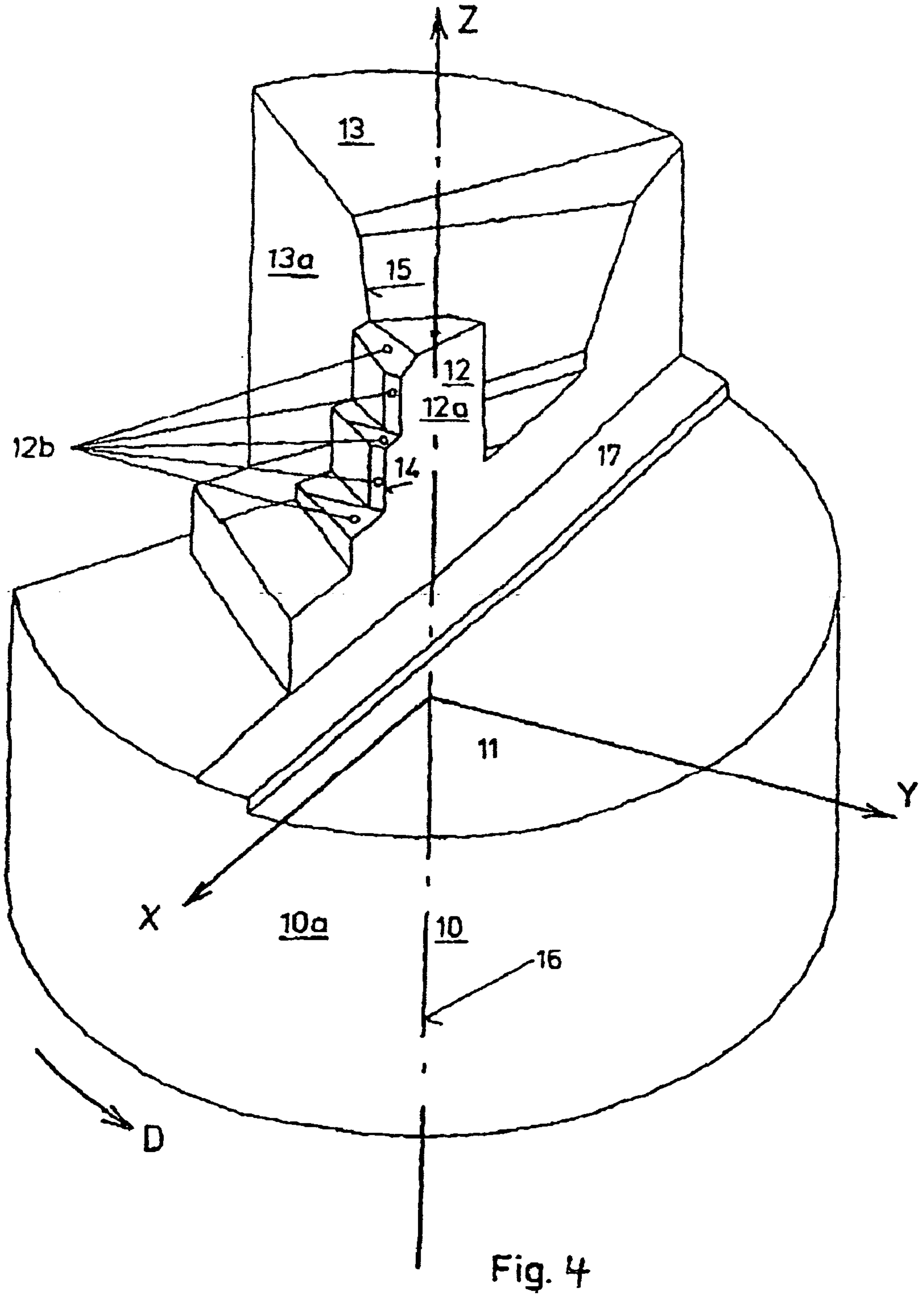

FIGS. 3 and 4 show a tool according to the invention in which the seat area element 12 and a cone element 13 are also configured in one piece on a common base piece 10*a*. In the illustrated exemplary embodiment, the cone element 13 forms the cone 5*a* and the shoulder 5*c* (FIG. 1).

The cone element 13 has a face surface 13*a* which preferably passes through the center of the base 10*a* (through the axis 16) and forms an angle of more than 90°, preferably approximately 120°, with the face surface 12*a*. This provides enough space for the removal of chips from the two cutting profiles 14 and 15, as well as sufficient mechanical strength of the two elements 12 and 13.

FIGS. 3 and 4, viewed in combination, show, in the axial direction, the deep incision in front of the face surface 13*a* and the groove between the seat area element 12 and the cone element 13. These free spaces can be created by the method described below. FIG. 3 also shows the complex configuration of the minuscule surfaces of the seat area element 12, which can also be manufactured in a precise way by following the method described below.

For both embodiments of the one-piece tool, the positioning of the tool 10 is carried out in several stages. In the first place, the axis 16 of the tool 10 is made to coincide with the axis of rotation of the precision spindle by displacing the tool or its clamping device in the direction X and/or Y (which form an orthogonal coordinate system with the direction Z, where the direction Z coincides with the axis 16). This is done by rotating the spindle into at least three, preferably four, predetermined and suitably marked orthogonal positions (which relate to the plane of the face 12*a*), and determining the precise distance of the cylindrical surface from the base 10*a* in these positions with respect to a precision dial indicator (Mikrokator) which is fixed during the positioning operation. The deviation measured in this way in the direction X or Y is corrected by displacing the tool until the deviation is less than 0.5 μm.

A number of specimens are then manufactured and measured. The deviations of the rough tips measured with respect to the desired dimensions can be rectified as follows.

To increase the diameters of the seat area 3, the tool 10 simply has to be displaced parallel to the plane of the face, in other words in the direction of the X axis. In this direction, the face plane 12*a* has been positioned precisely during the placing of the tool 10. Since the angle between the face planes 12*a* and 13*a* is greater than 90°, this provides a reduction of the diameter of the cone 5*a* and of the shoulder 5*c*. This can be compensated by a corresponding displacement towards the Y axis. If the angle between the face planes 12*a* and 13*a* is known, the amplitude of the displacement, in direction X and in direction Y, which provides the desired diameter of the seat area 3 and the desired thickness of the flange 9 can easily be determined by a numerical or graphic method. It must always be ensured that the axis 16 of the tool 10 remains exactly parallel to the axis of the precision spindle.

The manufacture of a tool according to the invention is carried out by wire erosion, possibly by using the aforementioned high-precision cylindrical rods with the skin surface in the base piece 10*a*. The wire is first brought towards the cylindrical skin surface of the rod and a small voltage (for example 10 V) is applied until contact is made, at which point, owing to the precise configuration of the rod, an exactly reproducible and exactly determined position of the wire, or more accurately of its skin surface, is found with respect to the axis of the rod 16. It is therefore possible to manufacture the various edges, surfaces and grooves of the tool 10 with the requisite precision, regardless of the various changes in position or clamping operations of the tool 10 or the wire.

Preferably, other references, surfaces or edges, should be provided for the manufacture of shoulders or the like which are not to be oriented either parallel or perpendicular to the axis 16.

To do this, it is necessary to determine and to take into account experimentally the distance of the skin surface from the wire with respect to the surface to be machined (spark gap) in the machining conditions (voltage substantially higher than in the aforementioned measurement operation, frequency used, capacitance, dimension of the surface, etc.). Preferred materials for the high-precision wire are tungsten, molybdenum, and brass-coated steel wire.

It should be emphasized again that the diameter of the tool 10 is only 4 mm in the cylindrical part provided for the determination of the position, and that the position of the cutting profiles 14 and 15 must be established to a precision of less than one micrometer. The surfaces 12*a*, 12*b*, and 12*c* of the cutting profile 14 and the similar surfaces of the cutting profile 15 must match the predetermined geometry to an accuracy of one micrometer.

This description will not include details such as the configuration of the edge or strip 17 which is used as a visually recognizable reference for mounting the tool 10 in precise alignment with respect to the X axis, during its manufacture and use. It will simply be noted that it is not absolutely essential for an area comprising a completely continuous outer cylindrical skin to be provided during the manufacturing and mounting of the tool 10 as shown in FIGS. 2 and 4, and that it is sufficient for there to be high-precision outer cylindrical skin areas where these are required for the adjustment or calibration of the spark erosion machine and for the positioning and adjustment of the precision spindle in the clamping device.

The invention is not limited to the illustrated example of embodiment, but can be modified in various ways. Thus in the first place the shape and position of the cutting profiles can be adapted to the required shape of the seat area 3 (conical base surface 3*b*, etc.) or of the cone 5*a* at the ballpoint pen tip. It is not necessary for another cone 5*b* to be joined to the cone 5*a*. Conventionally, the axial length of the base piece 10 is twice the diameter, but that is not a limiting condition.

What is claimed:

1. A tool for manufacturing a seat area and a cone of ballpoint pen tips, said tool comprising:

a base;

a seat area element, provided on said base, for manufacturing the seat area of a ballpoint pen tip; and a cone element, provided on said base, for manufacturing the cone of a ballpoint pen tip, wherein at least said seat area element is formed on said base, wherein said tool is rotatable about a longitudinal axis to manufacture the seat area and the cone of the ballpoint pen tips, wherein said seat area element has a seat area profile with an associated face surface at least substantially parallel to the longitudinal axis, wherein said cone element has a cone profile with an associated face surface at least substantially parallel to the longitudinal axis, and wherein the face surfaces of the seat area profile and the cone profile form an angle greater than 90°.

2. The tool as claimed in claim 1, wherein:

said tool is rotatable about an axis; and said base has a skin surface shaped in the form of a cylinder at least in partial areas about the axis of said tool.

3. The tool as claimed in claim 1, wherein said face surfaces of said seat area profile and said cone profile form an angle of approximately 120°.

4. The tool as claimed in claim 3, wherein a channel is defined between said seat area element and said cone element for the passage of chips.

5. The tool as claimed in claim 1, wherein a channel is defined between said seat area element and said cone element for the passage of chips.

6. The tool as claimed in claim 1, wherein said cone element is formed independently from said seat area element.

7. The tool as claimed in claim 6, wherein:

said base has a step along a rectilinear edge; and said cone element is fitted along said rectilinear edge in such a way that it can be displaced in said step.

8. The tool as claimed in claim 1, wherein said base, said seat area element, and said cone element are formed as a single monolithic piece.

9. A monolithic tool for manufacturing, by chip removal, a seat area and a cone of ballpoint pen tips, said seat area comprising:

a pilot bore;

a base surface having an annular shape; and a cylindrical bore which opens on a front surface, the tool comprising a seat area element for manufacturing the seat area of a ballpoint pen tip; and a cone element for manufacturing the cone of a ballpoint pen tip;

wherein said tool is rotatable about a longitudinal axis to manufacture the seat area and the cone of the ballpoint pen tips, wherein said seat area element has a seat area profile with an associated face surface at least substantially parallel to the longitudinal axis, wherein said cone element has a cone profile with an associated face surface at least substantially parallel to the longitudinal axis, and wherein the face surfaces of the seat area profile and the cone profile form an angle greater than 90°.

* * * * *